United States Patent [19]

Ohe

[11] Patent Number: 4,964,052
[45] Date of Patent: Oct. 16, 1990

[54] NAVIGATION DEVICE FOR USE IN A VEHICLE

[75] Inventor: Hidemi Ohe, Osaka, Japan

[73] Assignee: NEC Home Electronics Ltd., Osaka, Japan

[21] Appl. No.: 263,359

[22] Filed: Oct. 27, 1988

[30] Foreign Application Priority Data

Oct. 30, 1987 [JP] Japan .............................. 62-166571[U]
Oct. 30, 1987 [JP] Japan .............................. 62-166572[U]

[51] Int. Cl.$^5$ ................................................ G06F 15/50
[52] U.S. Cl. ..................................... 364/449; 340/995; 364/447
[58] Field of Search ........................ 364/449, 447, 457; 340/990, 995

[56] References Cited

U.S. PATENT DOCUMENTS

| | | | |
|---|---|---|---|
| 4,635,202 | 1/1987 | Tsujii et al. | 364/449 |
| 4,723,218 | 2/1988 | Hasebe et al. | 364/449 |
| 4,763,270 | 8/1988 | Itoh et al. | 364/449 |
| 4,792,907 | 12/1988 | Ikeda et al. | 364/449 |
| 4,796,189 | 1/1989 | Nakayama et al. | 364/449 |
| 4,796,191 | 1/1989 | Honey et al. | 364/450 |
| 4,827,420 | 5/1989 | Musa | 364/449 |

Primary Examiner—Thomas G. Black
Attorney, Agent, or Firm—Cushman, Darby & Cushman

[57] ABSTRACT

A navigation device which is mounted in a vehicle and in which the present location of the vehicle is presumed form the outputs from a direction sensor and movement distance sensor so that the presumed present location is displayed if it is coincident with a road map. In the navigation device, a present location presuming means is provided so that if there are a plurality of presumed present locations coincident with the road map, the locations are handled as actual present location candidates to serve as bases for the presumption of the present location of the vehicle until the propriety of the presumed present locations for actuality is negated by later presumption.

7 Claims, 3 Drawing Sheets

NAVIGATION DEVICE FOR USE IN A VEHICLE

BACKGROUND OF THE INVENTION

The present invention relates to a navigation device which is mounted in a vehicle and uses probability in is introduced into a map matching method in order to improve navigation accuracy of the vehicle.

A navigation device is mounted in a vehicle and indicates on a display unit mounted in the vehicle which the vehicle's present location. The types of devices help the driver of the vehicle to drive it to a destination.

FIG. 1 shows a conventional navigation device 1 which is mounted in a vehicle and basically operated by a central processing unit 4 to which a direction sensor 2, a movement distance sensor 3 and so forth are connected, to obtain the presumed present location of the vehicle. A road map read from a road map information recording medium 6 such as a CD-ROM through a reader 5 (which is called a medium controller) is stored in a buffer memory 7 and then indicated on a display unit 8 together with the presumed present location. The display unit 8, operated by a display controller 9, displays road map data stored in an image memory 10. The displayed map corresponds to the present location of the vehicle and the vicinity thereof. A route approximate to the shortest line extending from the starting place to the destination for the vehicle can also be displayed together with the road map data by manipulating the keys of a keyboard 11 connected to the central processing unit 4. As a result, the driver of the vehicle can take an optional route to the destination by viewing the destination and the shortest-line route displayed on the display unit 8.

However, the accuracy of devices such as gyroscope of a high accuracy type a terrestrial magnetism sensor and a steering angle sensor as the direction sensors vary considerably. Besides, the detection accuracy of the movement distance sensor 3 may deteriorate due to wheel slip or the like. As a result, the accuracy of the presumption of the present location of the vehicle through the navigation device 1 drops.

A map matching method in which road information is used as much as possible to judge whether or not the presumed movement loci of the vehicle are coincident with compensate for drops in sensor accuracy has received much attention. However, if there are a plurality of presumed present locations coincident with Y-crossed roads, mutually nearby right-turning roads or the like as shown in the road map in FIG. 1, it is difficult to judge which of the presumed present locations the proper one. Even if a presumed present location regarded as being of smaller presumption error is chosen as the proper one, it is often not the actual present location of the vehicle, because of accumulation in the operation of sensors. In that case, the later presumptions of the present location of the vehicle are further confused and the accuracy of the navigation device further deteriorates.

SUMMARY OF THE INVENTION

The present invention was made in order to solve the above-mentioned problems of the conventional navigation device.

Accordingly, it is an object of the present invention to provide a navigation device which is mounted in a vehicle and in which the present location of the vehicle is estimated from the outputs of a direction sensor and a movement distance sensor so that the presumed present location is displayed if it is coincident with a road map.

The navigation device is characterized in that a present location presuming means is provided so that if there are a plurality of presumed present locations coincident with the road map, the locations are handled as possible actual present locations to serve as bases for the presumption of the present location of the vehicle until the propriety of the presumed present locations for actuality is negated by later presumption. For that reason, the principle of probability is introduced into a map matching method effective for the presumption of the present location of the vehicle. This results in improved accuracy of the navigation sensing. Every time the vehicle passes through a node, the propriety of the listed possible actual present locations for actuality is examined to gradually reduce uncertainty and find out the presumed present location of the highest propriety for actuality. The presumption of the present location of the vehicle can then be with sufficient accuracy made high enough with the use of the direction sensor and the movement distance sensor, the detection accuracy of both of which is not lower than a prescribed level.

DESCRIPTION OF THE PREFERRED EMBODIMENTS

Embodiments of the present invention will be described in detail with reference to accompanying drawings.

Figure 1:
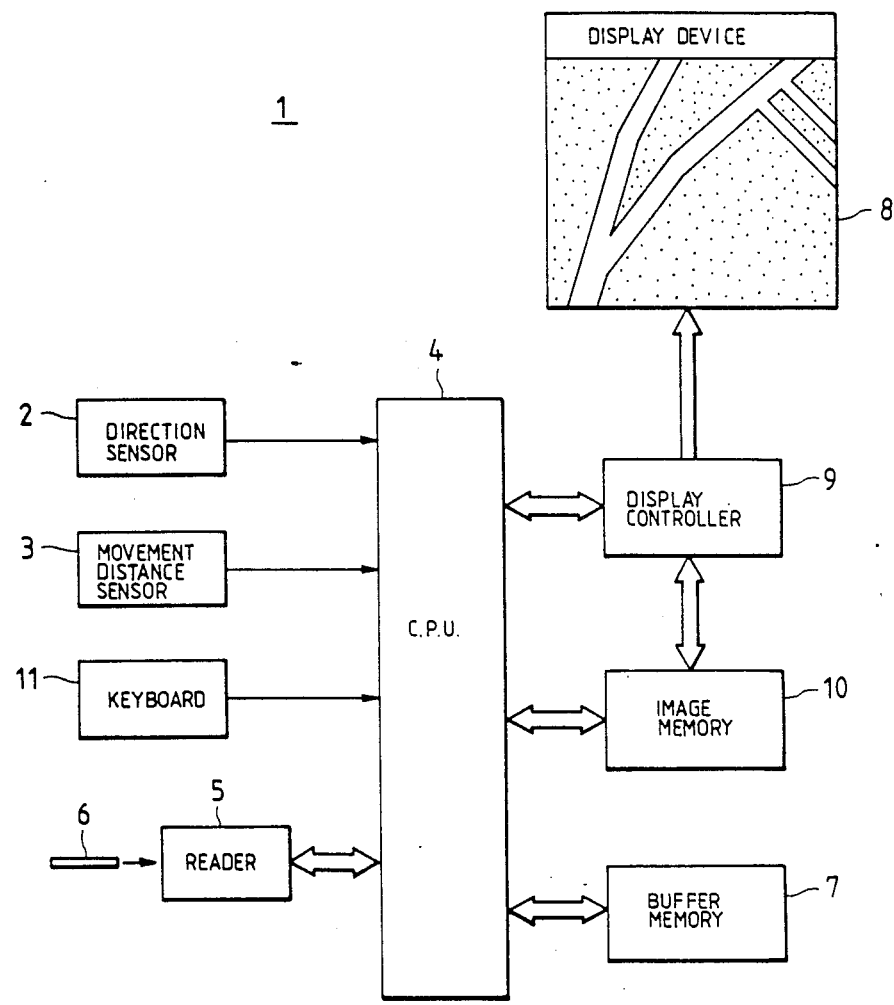
FIG. 1 shows a block diagram of the circuit configuration of a conventional navigation device for use in a vehicle.
Figure 2:
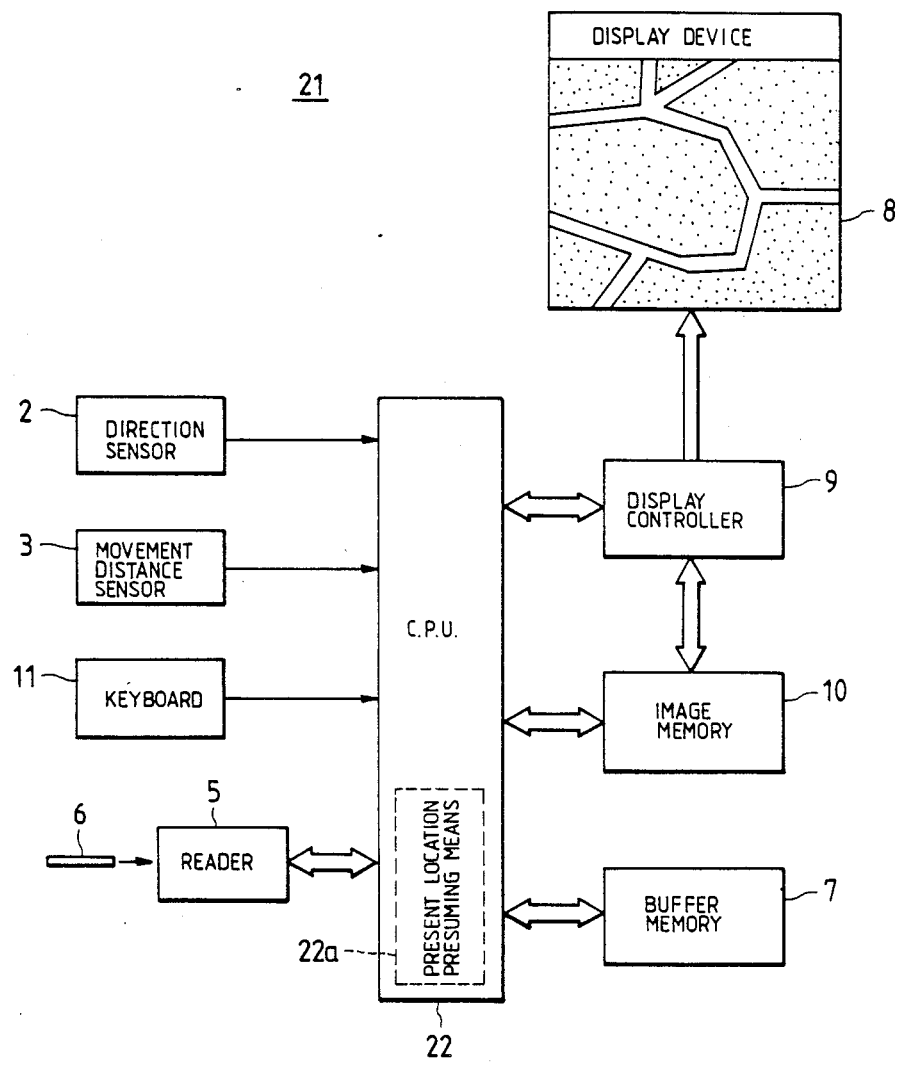
FIG. 2 shows a block diagram of the circuit configuration of a navigation device for use in a vehicle which is an embodiment of the present invention.

FIG. 2 shows a block diagram of the circuit configuration of a navigation device 21 which is one of the embodiments and is mounted in a vehicle. The device 21 includes a central processing unit 22 having a present location presuming means 22a in which if there are a plurality of presumed present locations coincident with a road map, the locations are handled as possible actual present locations to serve as bases for the presumption of the present location of the vehicle until the propriety of the presumed present locations for actuality is negated by later presumption. Roads shown in the road map are handled as straight lines each extending between the nodes at both the ends of the road, so that numerical data on the X and Y coordinates of the nodes, the numbers of the roads leading to the nodes, the angles of the roads and connecting nodes are recorded in a road map information recording medium 6.

The road map of 1/25,000 in scale, for example, is divided into several square sections, each of which is allotted with up to 65,536 serial numbers which are from 0000 to $FFFF_H$. Each of the X and Y coordinates of the nodes in each of the square sections of the rOad map is made of 32 bits to achieve such accuracy as to make one bit correspond to an actual distance of 0.5 mm. Among vehicle-passed nodes calculated from the outputs from a direction sensor 2 and a movement distance sensor 3, those coincident with the road map are listed as possible actual locations for the vehicle by the central processing unit 22 to basically presume the present location of the vehicle from vehicle movement loci obtained by connecting the nodes which are the highest propriety for actuality.

Figure 3:
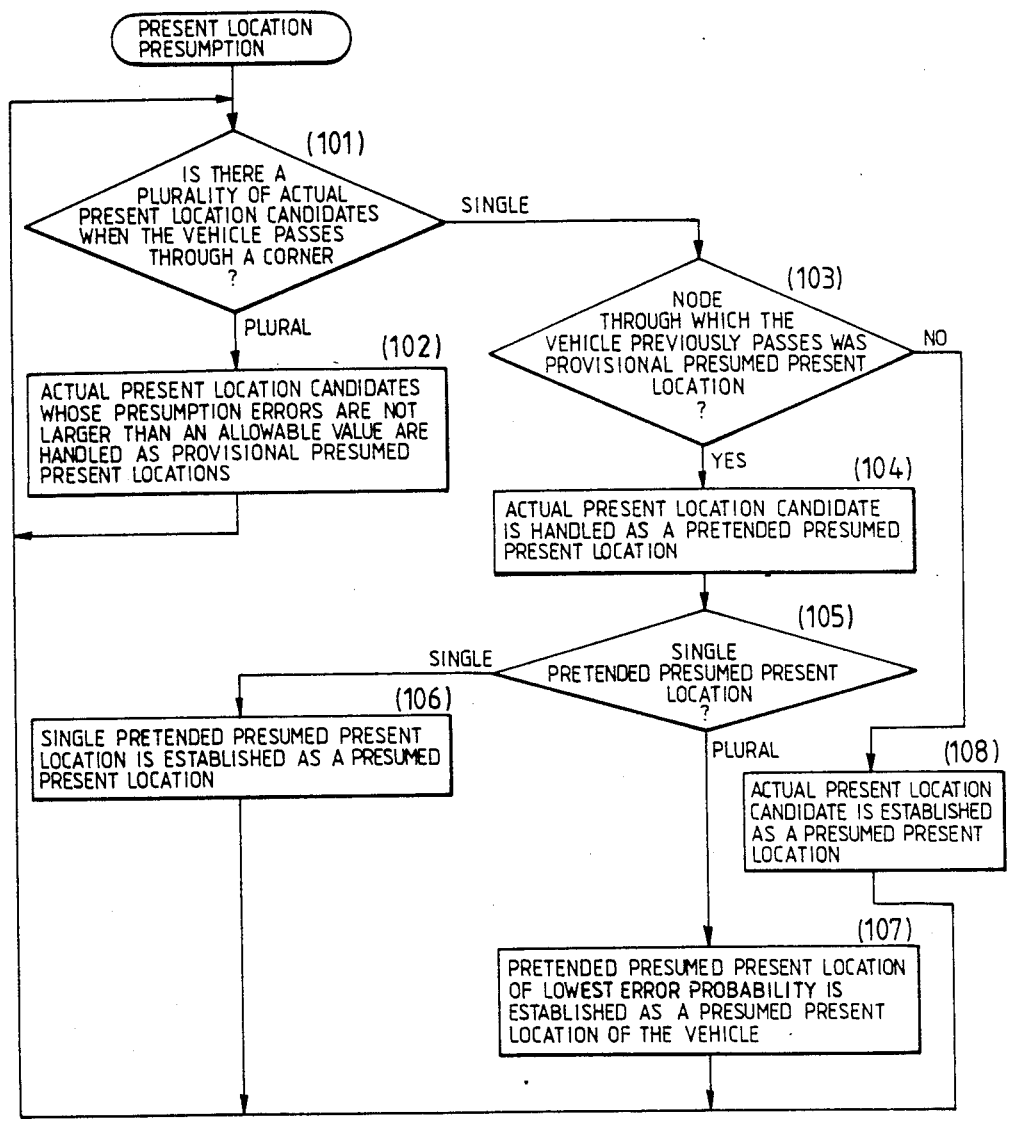
FIG. 3 shows a flow chart of the operation of the central processing unit of the navigation device shown in FIG. 2.

The map matching operation of the central processing unit 22 is now described in detail with reference to FIG. 3.

In a step 101, the unit 22 judges at every time when the vehicle passes through a node such as the corner of a road, an intersection or an inflection point whether there is a single actual present location candidate which is a presumed present location coincident with the road map, or there are a plurality of actual present location candidates which are presumed present locations coincident with the road map. When the unit 22 has judged in the step 101 that there are the plurality of actual present location candidates, step 102 follows so that among the location candidates, those whose presumption errors are not larger than an allowable value, respectively, are handled as provisional presumed present locations. On the other hand, when the unit 22 has judged in the step 101 that there is the single actual present location candidate, the unit judges in a step 103 whether or not the node through which the vehicle previously passed was a provisional presumed present location. When the unit 22 has judged in the step 103 that the previously passed node was not the provisional presumed present location, the unit immediately establishes in a step 108 the actual present location candidate as a presumed present location. When the unit 22 has judged in the step 103 that the previously passed node was the provisional presumed present location, the unit takes the step 104 so that the actual present location candidate at this time is handled as a pretended presumed present location.

Since the pretended presumed present location serves as a provisional actual present location candidate derived from an original actual present location candidate, the unit 22 judges in a step 105 whether there is a single pretended presumed present location or there are a plurality of pretended presumed present locations. When the unit 22 judged in the step 105 that there is the single pretended presumed present location, the unit regards other provisional presumed present locations as negated and establishes the single pretended presumed present location as the presumed present location of the vehicle in a step 106. On the other hand, when the unit 22 has judged in the step 105 that there are the plurality of pretended presumed present locations, the unit 22 regards a plurality of provisional presumed present locations as remaining not negated. In this condition, consequently, the unit 22 takes a step 107 so that the probability of occurrence of a presumption error during the movement of the vehicle from the provisional presumed present location to each of the pretended presumed present locations is calculated of to teach of the pretended presumed present location, and establishes the pretended presumed present location of the lowest error probability as the presumed present location of the vehicle. A judgment is thus finally made in accordance with the principle of probability if a plurality of actual present location candidates remain. Therefore, the presumed present location of the vehicle is not instantly determined on the basis of the mere magnitude of a presumption error. For that reason, it is possible to improve the accuracy of vehicle navigation.

As described above, the navigation device 21 functions so that if there are a plurality of presumed present locations coincident with the road map, the presumed present locations are handled as actual present location candidates to serve as the basis for the presumption of the present location of the vehicle unit until the propriety of these presumed present locations is negated.

As a result, when the vehicle is considered to pass from one road into another one after making a turn, for example, a plurality of nodes, for which the difference between the angle of each derivative road and the direction of stable movement of the vehicle is within a prescribed range, are listed as actual present location candidates. Every, time the vehicle thereafter passes through another node, the propriety of the actual present location candidates is examined to reduce uncertainty.

The present invention is not confined to the above-described embodiment but may be practiced or embodied in other various ways. For example, a present location presuming means is provided so that presumed present locations are left as actual present location candidates, and the presumption of the present location of a vehicle is continued while each of the actual present location candidates is handled as a provisional presumed present location. The actual present location candidate as to which the sum of presumption errors has exceeded a prescribed allowable value during the continuation is regarded as lacking the propriety for actuality and is consequently eliminated.

In such an embodiment, if there are a plurality of presumed present locations coincident with a road map, they are left as actual present location candidates and the presumption of the present location of the vehicle is continued with the use of each of the actual present location candidates as a provisional presumed present location until the propriety of the actual present location for actuality is negated by later presumption. A central processing unit 22 is provided with such a presuming function that the actual present location candidate as to which the sum of presumption errors has exceeded the prescribed allowable value while the continuation is regarded as lacking the propriety for actuality and is consequently eliminated. This results in improving the accuracy of navigation of the vehicle.

In the latter arrangement, parameters RPP indicative of the degrees of likelihood that the actual present location candidates are presumed present locations of actuality are used to calculate the probability of occurrence of the presumption errors. The parameter RPP is set at 100 if there is no difference between the direction of movement of the vehicle and that of a road or between the movement distance of the vehicle and the distance between nodes.

The numerical values to be set for the parameters RPP are determined in proportion to the degrees of the likelihood. In other words, when the vehicle has moved into one of the main and ramified roads crossed with each other as Y, for example, the direction of the vehicle- moved-in road, which is found out from a road map information recording medium 6, is compared with the direction of the vehicle, which is found out through a direction sensor 2, so that the parameter RPP for the main or the ramified road is set at 60 or 40, depending on the difference between both the compared directions.

When the vehicle has turned left into one of two left-turning roads near an intersection, the distance from a previously passed node to another node corresponding to the intersection is compared with the movement distance of the vehicle, which is found out through a movement distance sensor 3, so that the parameters RPP for both the roads near each other are set at 70 and 30, respectively, for example. However, if a parameter RPP is already set at a value in the process of presumption following that based.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. A navigation device mounted in a vehicle comprising:
   means for detecting a direction of said vehicle;
   means for detecting a movement distance of said vehicle;
   means for recording map information, said map information representing intersections as nodes; and
   control means for obtaining an updated presumed present location of said vehicle after said vehicle passes intersections, said control means comprising:
   means for presuming presumed present location candidates using detected directions and movement distances, said presumed present location candidates including a presumed present location,
   means for determining whether a plurality of presumed present location candidates exist that are within an allowable probability value after said vehicle passes first and subsequent intersections,
   means for identifying each of said plurality of presumed present location candidates as provisional presumed present locations after said vehicle passes said first and subsequent intersections, and
   means for establishing said updated presumed present location after passing one of said intersections comprising:
   means for setting said updated presumed present location as the presumed present location candidate if the presumed present location candidate was never identified as one of said plurality of provisional presumed present locations, and
   second means for setting said updated presumed present location as the presumed present location candidate that was identified as one of said plurality of provisional presumed present locations if another pretended present location of lesser error probability cannot be identified.

2. The navigation device of claim 1, wherein said vehicle direction detecting means comprises a hydroscope.

3. The navigation device of claim 1, wherein said vehicle direction detecting means comprises a terrestrial magnetism sensor.

4. The navigation device of claim 1, wherein said vehicle direction detecting means comprises a steering angle sensor.

5. The navigation device of claim 1, wherein said road map information recording means comprises a CD-ROM.

6. The navigation device of claim 1, further comprising a buffer memory means for storing said road map information.

7. A navigation method for a vehicle comprising the steps of:
   detecting a direction of said vehicle;
   detecting a movement distance of said vehicle;
   recording map information, said map information representing intersections as nodes; and
   obtaining an updated presumed present location of said vehicle after said vehicle passes intersections, said obtaining step comprising the steps of:
   presuming presumed present location candidates, including a presumed present location, using detected directions and movement distances,
   determining whether a plurality of presumed present location candidates exist that are within an allowable probability value, after said vehicle passes first and subsequent intersections,
   identifying each of said plurality of presumed present location candidates as provisional presumed present locations after said vehicle passes said first and subsequent intersections, and
   establishing said updated presumed present location after passing one of said intersections, said establishing step comprising the steps of:
   setting said updated presumed present location as the presumed present location candidate if the presumed present location candidate was never identified as one of said plurality of provisional presumed present locations, and
   setting said updated presumed present location as the presumed present location candidate that was identified as one of said plurality of provisional presumed present locations if another pretended present location of lesser error probability cannot be identified.

* * * * *